US012578678B2

(12) United States Patent
Hong et al.

(10) Patent No.: US 12,578,678 B2
(45) Date of Patent: Mar. 17, 2026

(54) HOLOGRAM ACQUISITION APPARATUS HAVING BEAM SPLITTER AND ANNULAR SPHERICAL ARRAY

(71) Applicant: Electronics and Telecommunications Research Institute, Daejeon (KR)

(72) Inventors: Kee Hoon Hong, Daejeon (KR); Ki Hong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 331 days.

(21) Appl. No.: 18/350,547

(22) Filed: Jul. 11, 2023

(65) Prior Publication Data

US 2024/0069491 A1     Feb. 29, 2024

(30) Foreign Application Priority Data

Aug. 23, 2022     (KR) ........................ 10-2022-0105502

(51) Int. Cl.
| | |
|---|---|
| *G02B 5/09* | (2006.01) |
| *G02B 27/10* | (2006.01) |
| *G03H 1/04* | (2006.01) |

(52) U.S. Cl.
CPC ............. *G03H 1/0443* (2013.01); *G02B 5/09* (2013.01); *G03H 2001/0445* (2013.01); *G03H 2222/45* (2013.01); *G03H 2223/24* (2013.01)

(58) Field of Classification Search
CPC ....... G02B 5/09; G02B 5/10; G02B 27/10–16
See application file for complete search history.

(56) References Cited

U.S. PATENT DOCUMENTS

2020/0049492 A1     2/2020   Kim et al.

FOREIGN PATENT DOCUMENTS

KR     10-2020-0016794     2/2020

OTHER PUBLICATIONS

Nobukawa et al., "Single-shot phase-shifting incoherent digital holography with multiplexed checkerboard phase gratings", Optics Letters, Apr. 15, 2018, vol. 43, No. 8, pp. 1698-1701.

*Primary Examiner* — Ryan S Dunning
(74) *Attorney, Agent, or Firm* — KILE PARK REED & HOUTTEMAN PLLC

(57) ABSTRACT

A hologram acquisition apparatus and a hologram acquisition system are disclosed. A hologram acquisition apparatus includes a beam splitter configured to split light emitted from an object into a first beam and a second beam, a first reflective optical element configured to receive and emit the first beam to the beam splitter, and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces and, the plurality of segment regions are formed to have the same focal point.

19 Claims, 5 Drawing Sheets

HOLOGRAM ACQUISITION APPARATUS HAVING BEAM SPLITTER AND ANNULAR SPHERICAL ARRAY

CROSS-REFERENCE TO RELATED APPLICATIONS

The present application is based on, and claims priority from, Korean Patent Application Number 10-2020-0105502, filed Aug. 23, 2022, the disclosure of which is incorporated by reference herein in its entirety.

TECHNICAL FIELD

The present disclosure in some embodiments relates to a hologram acquisition apparatus and system. More particularly, the present disclosure relates to a hologram acquisition apparatus and system for obtaining a high-resolution hologram in a large recording area.

BACKGROUND

A hologram may be obtained by using a light source having coherence, such as a laser or natural light.

The laser light source is scattered from an object, thereby generating object light containing information on the reflective object and reference light for interfering with the object light. A hologram may be formed with the object light and the reference light interfering with each other.

On the other hand, even under a condition of a general light source (or natural light) with low coherence, when an optical path difference of two channels is within a coherence distance of the light source used, interference may occur between the channels, and a hologram may be obtained. Self-interference incoherent digital holography (SIDH), that is, self-interference digital holography using an incoherent light source is a technique proposed to obtain a hologram by using a Michelson interferometer structure instead of using a laser, which is a coherent light source.

FIG. 1 is a schematic diagram of a configuration of a conventional hologram acquisition apparatus using SIDH.

As shown in FIG. 1, the SIDH using the Michelson interferometric technique may, without a separate channel to form the reference light, separate object light (spherical wave) scattered from the object point into two channels by the beam splitter, and then, through phase modulation mirrors having different curvatures of each of the channels, modulate light separated to have different characteristics. After such optical modulation, the SIDH can use the beam splitter to merge the two modulated light beams into one channel and thereby form an interference fringe.

At this time, to minimize the difference between the optical paths of the two channels, generally, the length of the optical paths with respect to the chief ray of the two channels may be set equal. There is a need for the curvature of the phase modulation mirrors to be set so that the degree of optical modulation that is based on marginal rays is realized within a short coherence distance (<tens of μm) of natural light, which then allows a hologram to be obtained over the area equivalent to the entire mirror plane.

In the Michelson interferometric SIDH optical system, when one phase modulation mirror is assumed to be flat, the phase modulation can be determined by the curvature of another phase modulation mirror. The greater the curvature, the higher the frequency of image information stored in the form of a hologram, and therefore it is advantageous to use a spherical mirror with a large curvature as a phase modulation mirror to obtain high-resolution hologram information. However, as the curvature of phase modulation increases, the optical path between light incident between the center of the phase modulation mirror and the periphery is increased. For example, when collimated light is incident on the SIDH optical system, for example, when the object is infinitely far away, the maximum difference of optical paths between the mirror center and edge may be twice the sagittal height (Sag). With SIDH using natural light having a short coherence distance as a light source, the difference of optical paths for each position of incidence on the mirror is greater than the coherence distance and causes a problem of object information in the relevant area not being recorded as a hologram.

In the Michelson interferometric SIDH optical system, the increase in the curvature of the phase modulation mirror improves the resolution of the hologram, while adversely reducing the hologram recording area. Therefore, a phase modulation optical system that overcomes the trade-off is required.

SUMMARY

According to at least one embodiment, the present disclosure provides a hologram acquisition apparatus including a beam splitter configured to split light emitted from an object into a first beam and a second beam, a first reflective optical element configured to receive and emit the first beam to the beam splitter, and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces, and the plurality of segment regions are formed to have the same focal point.

According to another embodiment, the segment regions are formed to have different curvatures.

According to yet another embodiment, the segment regions include a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm'. Here, based on that the first segment region is closest to the center point and the m-th segment region is adjacent to an outermost edge of the second reflective optical element, a difference in a radius of curvature between the n+1-th segment region and the n-th segment region is set to twice a difference in sagittal height (Sag) between the n+1-th segment region and the n-th segment region.

According to yet another embodiment, the segment regions are arranged to have a spherical shape that is optically continuous.

According to yet another embodiment, the segment regions include a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm'. Here, based on that the first segment region is closest to the center point and the m-th segment region is adjacent to the outermost edge of the second reflective optical element, a first diameter based on a radius of curvature of the n+1-th segment region and a difference in Sag between the n+1-th segment region and the first segment region and a second diameter based on a radius of curvature of the n-th segment region and a Sag of the n-th segment region are set to be the same.

According to yet another embodiment, the segment regions include a number, m, of segment regions that share, as a common center point, a center along a radial direction of the second reflective optical element and include a first segment region that is closest to the center point and has a Sag which is equal to or less than half of a coherence distance of the light.

According to yet another embodiment, the second reflective optical element has a thickness that is equal to a Sag of a first segment region.

According to another embodiment, the present disclosure provides a hologram acquisition apparatus. The hologram acquisition apparatus includes a beam splitter configured to split light emitted from an object into a first beam and a second beam, a first reflective optical element configured to receive and emit the first beam to the beam splitter, and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces, and the plurality of segment regions are formed to have the same curvature.

According to yet another embodiment, the segment regions include a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm'. Here, based on that the first segment region is closest to the center point and the m-th segment region is adjacent to an outermost edge of the second reflective optical element, the n+1-th segment region and the n-th segment region have respective sagittal heights (Sag values) that differ by a constant value.

According to yet another embodiment, the segment regions are arranged to have a spherical shape that is optically discontinuous.

According to yet another embodiment, the segment regions include a number, m, of segment regions that share, as a common center point, a center along a radial direction of the second reflective optical element and wherein a Sag of a first segment region that is closest to the center point is equal to or less than half of a coherence distance of the light.

According to yet another embodiment, the second reflective optical element has a thickness that is equal to a Sag of a first segment region.

According to another embodiment, the present disclosure provides a hologram acquisition system. The hologram acquisition system includes a hologram acquisition apparatus, and an image-generating device configured to generate a holographic image by receiving an interference fringe generated from the hologram acquisition apparatus. The hologram acquisition apparatus includes a beam splitter configured to split light emitted from an object into a first beam and a second beam, a first reflective optical element configured to receive and emit the first beam to the beam splitter, and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces, and the plurality of segment regions are formed to have the same focal point.

It is to be understood that the foregoing summarized features are merely exemplary aspects of the following detailed description of the present disclosure, and are not intended to limit the scope of the present disclosure.

DETAILED DESCRIPTION

Figure 1:
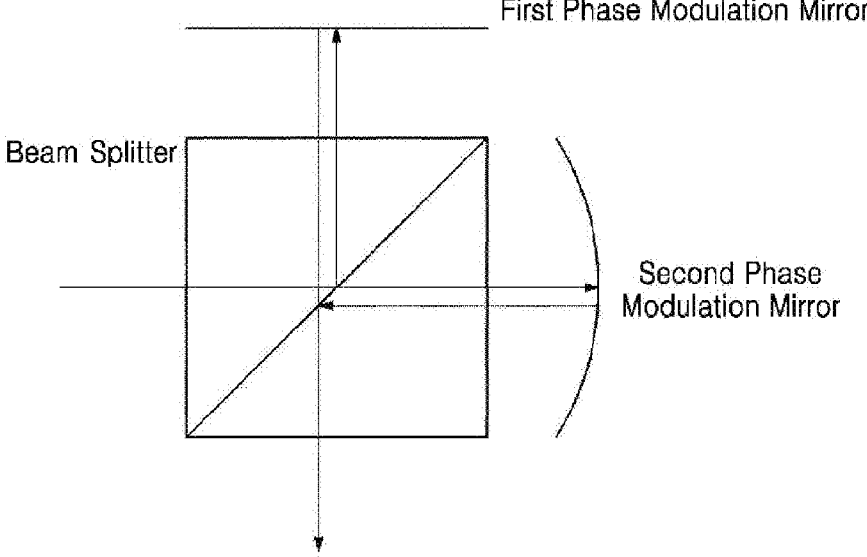
FIG. 1 is a schematic diagram of a configuration of a conventional hologram acquisition apparatus using SIDH.

The present disclosure in some embodiments seeks to provide a hologram acquisition apparatus and system for obtaining a high-resolution hologram in a large recording area.

The technical tasks to be achieved in the present disclosure are not limited to those mentioned above, and other unmentioned technical tasks will be clearly understood by those skilled in the art from the description below.

Hereinafter, the embodiments of the present disclosure are described in detail for those skilled in the art to easily practice, with reference to the accompanying drawings. The present disclosure, however, may be embodied in various forms, and should not be construed as being limited only to the illustrated embodiments.

In describing the embodiments of the present disclosure, a detailed description of related known elements or functions will be omitted for the purpose of clarity and for brevity. In the drawings, elements irrelevant to the present disclosure are omitted for the simplicity of explanation, and like reference numerals denote like elements throughout the whole document.

In the present disclosure, an element when referred to as being "connected," "coupled," or "joined" to another element is meant to be not only directly but also indirectly connected, coupled, or joined to another element through intervening elements. Additionally, a specific element referred to as "including" or "having" another element is meant to be not exclusive of another element, but rather inclusive of further elements unless stated otherwise.

In the present disclosure, ordinal adjectives "first," "second," etc. may be used solely to differentiate one element from another but not to define the order or priority of elements. Accordingly, a first element so named in one embodiment may be renamed a second element in another embodiment without departing from the scope of the present disclosure. Likewise, a second element in one embodiment may be renamed a first element in another embodiment.

In the present disclosure, separate individual components are distinctively presented merely to clearly illustrate the respective component features, which is not meant to represent that the respective components are necessarily isolated. Namely, multiple components may be combined into a single hardware unit or single software unit, and a single component may be distributed into multiple hardware units or multiple software units for realizing the component features. Thus, the scope of the present disclosure is to be understood as being inclusive of all embodiments with their components combined or distributed without further clarification.

In the present disclosure, the components described in various embodiments are not necessarily meant to be requisite components, but they may include some optional components. Therefore, the scope of the present disclosure encompasses embodiments composed of a subset of components described in one embodiment. Further, the scope of the present disclosure encompasses embodiments that incorporate various other embodiments combined with additional components.

As used in the present disclosure, various positional and orientation terms such as upper, lower, left, right, etc., are used only as relative conventions to facilitate the description of some embodiments, and the described orientations may be reinterpreted as the viewing direction changes with the drawing illustrations.

In the present disclosure, "A or B," "at least one of A and B," "at least one of A or B," "A, B, or C," "at least one of A, B, and C," "at least one of A, B, or C," and "at least one of A, B, C, or combination thereof" each may represent any one of the items listed together in the place of "A," "B," and "C" or all possible combinations of the listed items.

Figure 2:
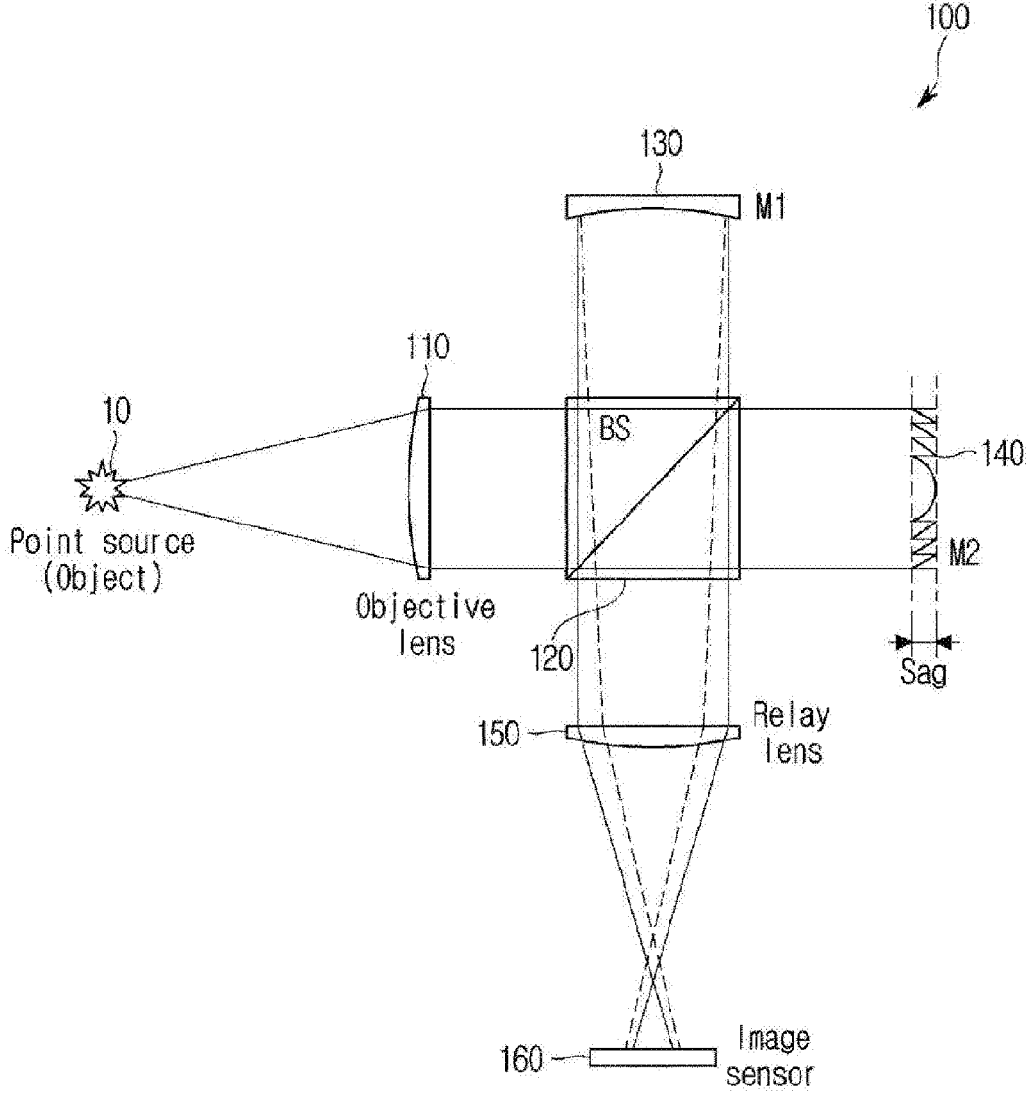
FIG. 2 is a diagram of a configuration of a hologram acquisition system according to some embodiments of the present disclosure.

The following describes a hologram acquisition system according to at least one embodiment of the present disclosure by referring to FIG. 2, which is a diagram of a configuration of a hologram acquisition system 100 according to some embodiments of the present disclosure.

The hologram acquisition system 100 is a device that generates a hologram based on, for example, natural light, and it can obtain a hologram in real-time by having an image-generating device 160 including a polarization image sensor. In the present disclosure, the hologram acquisition system 100 is illustrated as a system based on natural light, but the present disclosure may also be applied to a system using a laser light source, which is a coherent light source.

The hologram acquisition system 100 has a two-channel light path and can generate self-interference digital holography using a two-channel incoherent light source.

Specifically, the hologram acquisition system 100 may include a hologram acquisition apparatus and the image-generating device 160. The hologram acquisition apparatus generates an interference fringe based on natural light scattered from an object 10. The image-generating device 160 generates a hologram image by performing image displacement processing on the interference fringe.

The hologram acquisition apparatus may include an objective lens 110, a beam splitter 120, a first reflective optical element 130, a second reflective optical element 140, and a relay lens 150.

The objective lens 110 may condense incident light from the object 10 while passing it, and transmit the incident light to the beam splitter 120.

The beam splitter 120 may separate the object light scattered from the object 10 into two channels and emit the separated light beams to the first and second reflective optical elements 130 and 140. Specifically, an object 10 emits natural light incident thereon which is received by the beam splitter and split into a first beam and a second beam, and outputs the first and second beams to the first and second reflective optical elements 130 and 140, respectively.

The beam splitter 120 combines the first beam and the second beam emitted by the first and second reflective optical elements 130, 140 to have a difference in optical path and wavefront and may output the combined first and second beams to the relay lens 150.

The beam splitter 120 may be of a non-polarization type, for example. As another example, the beam splitter 120 may be configured to have a polarization-type beam-splitting function. In this case, the beam splitter 120 may split the emitted light into the first and second beams having polarizations of different types. For example, the first and second beams may be formed with linear polarization of different angles.

The first and second reflective optical elements 130, 140 may generate a difference in an optical path between the two channels and modulate the wavefront of each channel to emit light. In particular, the first and second reflective optical elements 130, 140 may receive the first beam and the second beam and emit them to the beam splitter 120.

The first reflective optical element 130 is illustrated as a mirror having a flat surface in FIG. 2, although the present disclosure may employ any type of a reflective optical system capable of differently modulating light passing through two optical paths to form a hologram. The first reflective optical element 130 may have, for example, a reflective optical surface in the form of a concave, convex, free curved surface, and/or a scattering reflective surface, or it may be composed of a diffractive optical element.

Figure 3:
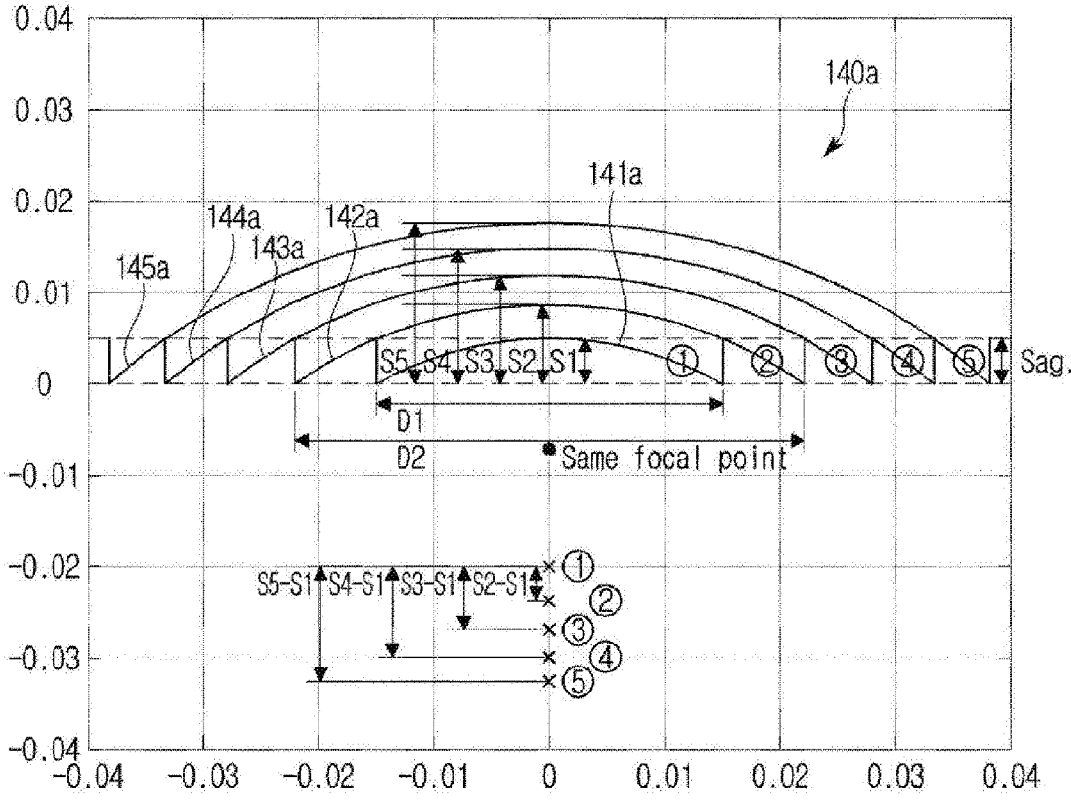
FIG. 3 is a diagram of an example configuration of a second reflective optical element included in a hologram acquisition apparatus according to at least one embodiment of the present disclosure.
Figure 4:
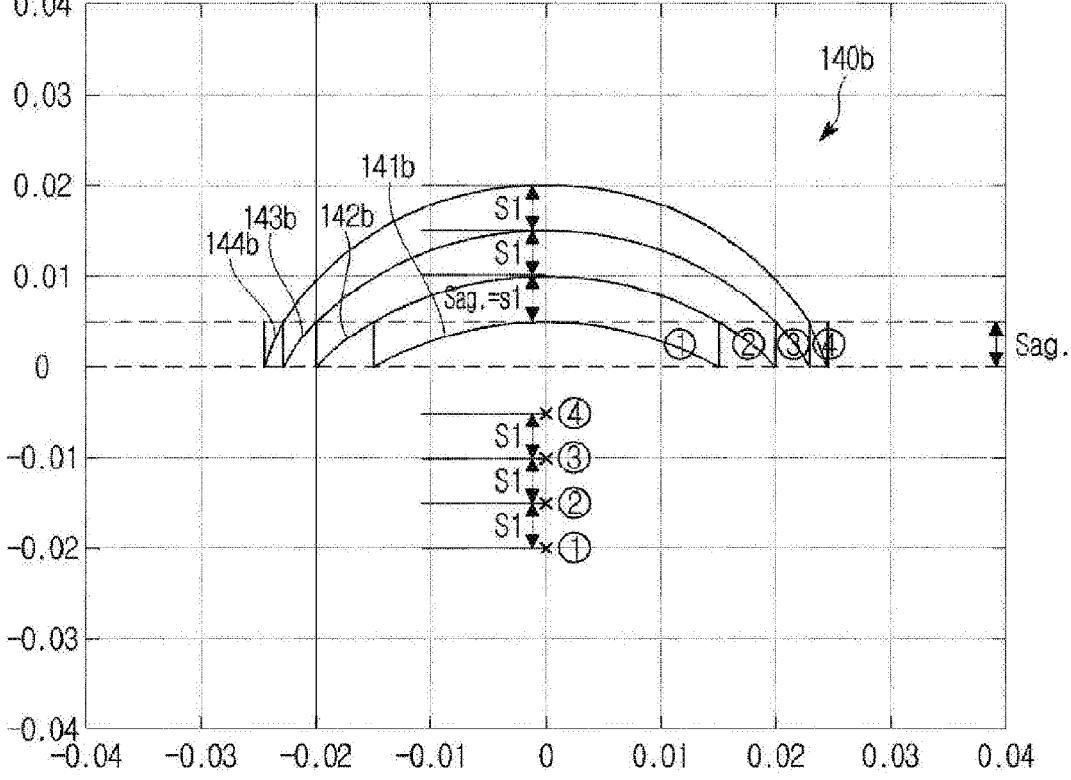
FIG. 4 is a diagram of an example configuration of a second reflective optical element included in a hologram acquisition apparatus according to another embodiment of the present disclosure.

The second reflective optical element 140 according to some embodiments of the present disclosure may be formed as an annular spherical array having discontinuous surfaces. The second reflective optical element 140 is configured in a manner similar to, for example, a Fresnel lens, but unlike a Fresnel lens that lets light transmitted through the medium of a specific refractive index, the second reflective optical element 140 uses segmented curved surfaces to incorporate the light reflective characteristics of mirror. The second reflective optical element 140 is a novel optical element with the above characteristics incorporated. Reflective optical elements conventionally employed for a hologram acquisition apparatus use a single thick spherical mirror, but the second reflective optical element 140 according to the present disclosure may be formed by dividing a continuous surface of a single spherical mirror into step-like concentric discontinuous surfaces. In the hologram acquisition apparatus using the Michelson interferometric SIDH optical system, when the first reflective optical element is a planar phase-modulation mirror, the curvature of the second reflective optical element 140 that functions as a phase modulation mirror may determine the degree of phase modulation in the form of a Fresnel zone plate. The detailed configuration of the second reflective optical element 140 will be described below with reference to FIGS. 3 and 4 illustrating various embodiments.

The relay lens 150 may condense a light emitted as two light beams merged after modulation by the beam splitter 120 to the image-generating device 160. The present disclosure illustrates the relay lens 150 disposed between the beam splitter 120 and the image-generating device 160, but various optical elements may be additionally installed. For example, the added optical element may be a polarization control element. In order to be applied to the phase shifting process performed in the image-generating device 160, the polarization control element may convert linearly polarized light beams of the first and second beams emitted from the beam splitter 120 into a predetermined form of polarized light beams and output the predetermined form of polarized light beams. The two linearly polarized light beams may be formed with phases different from each other. The polarization control element may be composed of, for example, a quarter-wave plate.

An additional optical system may be disposed between at least one of the first or second reflective optical elements 130, 140 and the beam splitter 120. The additional optical system may be at least one quarter-wave plate.

The image-generating device 160 may comprise an image sensor which may be, for example, a CCD sensor. The image-generating device 160 may include, for example, a polarization image sensor to function as a polarization selection element. The polarization image sensor may include a micro polarizer array (not shown) attached to the front surface of the image sensor. The micro polarizer array may include a plurality of micro polarizers (not shown) that convert transmitted light into polarized light beams of a predetermined form. The micro polarizer array may be formed such that the micro polarizers are arranged to correspond respectively to a plurality of segment regions of the image sensor array. The image sensor array includes a plurality of pixel arrays, and micro polarizers may be formed to correspond respectively to pixels of the image sensor array. In this case, light transmission axes of the micro polarizers may be formed to have different angles so that the phases of polarized light converted through the micro polarizers are different for each micro polarizer. This enables the polarized light beams converted through each of the micro polarizers to have a phase difference according to the angle of the light transmission axis. A plurality of polarized light beams converted by passing through the micro polarizers may be received in a polarized state by the image sensor. In this case, an interference fringe may be generated by the interference of a plurality of converted polarized light beams, and the generated interference fringe may be obtained by the image sensor.

FIG. 3 is a diagram of an example configuration of a second reflective optical element 140*a* included in a hologram acquisition apparatus according to at least one embodiment of the present disclosure.

The second reflective optical element 140*a* may be formed as an annular spherical array having discontinuous surfaces. Additionally, the second reflective optical element 140*a* includes a plurality of concentric segment regions 141*a* to 145*a* divided to have discontinuous surfaces, and the segment regions 141*a* to 145*a* may be formed to have the same focal point. The segment regions 141*a* to 145*a* may be formed to have different curvatures so that the segment regions 141*a* to 145*a* each have the same focal point.

FIG. 3 illustrates a designed array of annular spherical mirrors with Sn assumed to be a Sag (sagittal height) value calculated based on the reference height (y=0) of a spherical mirror corresponding to each segment region 'n', and with Dn and Rn assumed to be the diameter and radius of curvature, respectively, of each segment region 'n'. The mark 'x' indicates the center of the spherical mirror corresponding to each of the segment regions 141*a* to 145*a*, and the designed array of annular spherical mirrors has a shape represented by the solid lines between the two dotted lines indicating Sag length.

In addition to sharing the center along the radial direction of the second reflective element 140*a* as a common center point, the plurality of segment regions 141*a* to 145*a* may be configured as a number, m, of segment regions 141*a* to 145*a* arranged along the radial direction. The radial direction may be the direction of a straight line connecting the outermost edges of the second reflective optical element 140*a* parallel to D1 and D2 (or the horizontal direction) shown in FIG. 3. In FIG. 3, 'm' is 5, and there may be five segment regions 141*a* to 145*a*. In this case, the diameter may be the length of a line segment connecting the outer edges of the 5th segment region 145*a*.

The second reflective optical element 140*a* may be manufactured to have a thin thickness by using segmented curved surfaces (or segment regions) having physically discontinuous surfaces instead of using a single spherical mirror. The thickness may be a length along the y-axis direction which is perpendicular to the radial direction. The overall Sag of the second reflective optical element 140*a* is designed to have the Sag value of the first segment region 141*a*, so that the thickness of the second reflective optical element 140*a* may be as thin as the Sag value of the first segment region 141*a*. The Sag value may be the thickness of the mirror-curvature portion and may be obtained by Equation 1, R may be the radius of curvature of each of the segment regions 141*a* to 145*a*, and D may be the diameter of each segment region.

$$Sag = R - \sqrt{R^2 - (D/2)^2} \qquad \text{Equation 1}$$

As described above, Equation 2 needs to be satisfied for each of the segment regions 141*a* to 145*a* to have a common focal position.

When the first segment region 141*a* is closest to the center point along the radial direction and the m-th segment region 145*a* is adjacent to the outermost edge of the second reflective optical element, the difference in radius of curvature (R) between the n+1-th segment region and n-th segment region may be set as twice the difference in Sag between the n+1-th segment region and n-th segment region. In the following Equation, Sn may be a Sag increment of each of the segment regions 141*a* to 145*a*, and Rn may be a radius of curvature of each of the segment regions 141*a* to 145*a*. The number 'n' may be an integer greater than or equal to 1 and smaller than 'm'. In FIG. 3, 'n' may be circled 1 to 5.

$$R_{n+1} = R_n + 2(S_{n+1} - S_n) \qquad \text{Equation 2}$$

Additionally, to satisfy the condition of having a common focal position, taking FIG. 3 as an example, there is a need for the Sag increment Sn, when the number of the segment region 141*a* to 145*a* increases, to be equal to an amount of movement of the vertical coordinates of the spherical mirrors corresponding to each of the segment regions 141*a* to 145*a*. This can be expressed as Equation 3. $y_n$ is the coordinate of the center of the spherical mirror of each of the segment regions 141*a* to 145*a* and can be described by Equation 3 as the center of the spherical mirror has a negative coordinate.

$$y_{n+1} = y_n - (S_{n+1} - S_n) \qquad \text{Equation 3}$$

The second reflective optical element 140*a* needs to satisfy additional conditions. Specifically, the plurality of segment regions 141*a* to 145*a* may be arranged to have a spherical shape that is optically continuous with each other. The array of annular spherical mirrors of each of the segment regions 141*a* to 145*a* may have an optical surface shape that is continuous in a radial direction (a horizontal direction in the diagram of FIG. 3). Where each of the spherical surfaces of the second to m-th segment regions 142*a* to 145*a* are respectively connected to the edges of their adjacent segment regions toward the center of the spherical mirror (vertical direction in the diagram of FIG. 3), the phrase 'spherical shape that is optically continuous' may mean that a single continuous curved surface is formed such that the respective spherical surfaces of the first to m-th segment regions 141a to 145a have the common spherical mirror center.

This needs Equation 4 to be satisfied. $f_D$ may be the diameter D of the n-th segment region.

$$f_D(S_n,R_n)=f_D(S_{n+1}-S_1,R_{n+1})$$ Equation 4

Where the first segment region 141a is closest to the center point and the m-th segment region 145a is adjacent to the outermost edge of the second reflective optical element 140a, the present disclosure establishes a first diameter based on a radius of curvature R of the n+1-th segment region and a difference in Sag between the n+1th segment region and the first segment region and establishes a second diameter based on a radius of curvature of the n-th segment region and a Sag of the n-th segment region, with the first diameter and the second diameter being set to be equal in Equation 4. 'n' may be an integer greater than or equal to 1 and smaller than 'm'. In FIG. 3, 'n' may be the circles numbers 1 to 5.

In Equation 4, $f_D$ can be calculated by Equation 5 below. Equation 5 may be derived by Equations 1 to 3.

$$f_D(S,R)=2\sqrt{2SR-S^2}$$ Equation 5

Equation 2 substituted into Equation 4 is equivalent to Equation 6, and arranging Equation 6 with the variable $S_n+1$ can be expressed as Equation 7.

$$f_D(S_n,R_n)=f_D(S_{n+1}-S_1,R_n+2(S_{n+1}-S_n))$$ Equation 6

$$3S_{n+1}^2+(2R_n-4S_n-2S_1)S_{n+1}+S_n^2+(4S_1-2R_n)S_n-S_1^2-2R_nS_1=0$$ Equation 7

Additionally, the second reflective optical element 140a needs to satisfy additional conditions. The Sag of the first segment region 141a closest to the center point may be set to be equal to or less than ½ of the coherence distance of light. The Sag of the first segment region 141a is the overall Sag and may be an initial Sag value which is a design input variable. The coherence distance can be obtained as shown in Equation 8. In Equation 8, λ may be the wavelength of the light source, and Δλ may be the bandwidth of the light source. For example, with a blue wavelength that is λ=450 nm and a bandwidth Δλ that is 10 nm, the overall Sag of the first segment region 141a and the thickness of the second reflective optical element 140a may be set to the level of half of 20.25 μm, which is the coherence distance.

$$CL=\lambda^2/\Delta\lambda$$ Equation 8

With the second reflective optical element 140a of the present disclosure, a sufficient curvature is secured to implement a high-resolution hologram, and at the same time, an optical path difference is formed within the coherence distance to obtain the high-resolution hologram in a large recording area.

Additionally, the second reflective optical element 140a may have the following advantages compared to a second reflective optical element 140b in FIG. 4 to be described next. When designed like the second reflective optical element 140b of FIG. 4, the focal positions of the spherical mirrors in each of the segment regions may be different from each other. When the second reflective optical element 140b of FIG. 4 is applied to the SIDH optical system used in the hologram acquisition apparatus, a non-ideal point spread function (PSF) including aberration may occur. On the other hand, the second reflective optical element 140a as in FIG.

3 is designed to have the same focal position in all segment regions, preventing the aforementioned issue from occurring.

FIG. 4 is a diagram of an example configuration of the second reflective optical element 140b included in a hologram acquisition apparatus according to another embodiment of the present disclosure.

The second reflective optical element 140b may be formed as an annular spherical array having discontinuous surfaces. Additionally, the second reflective optical element 140b may include a plurality of concentric segment regions 141b to 144b divided to have discontinuous surfaces. Unlike the second reflective optical element 140a in FIG. 3, the plurality of segment regions 141b to 144b may have the same curvature. Due to the same curvature, the plurality of segment regions 141b to 144b may be formed to have mutually optically discontinuous spherical shapes.

FIG. 4 illustrates an array of annular spherical mirrors in the case where all segment regions have the same curvature under the conditions that Sag=5 mm and radius of curvature R=25 mm. The center of the spherical mirror corresponding to each of the segment regions 141b to 144b is indicated by x, and the designed array of annular spherical mirrors has shapes represented by the solid lines between the two dotted lines indicating Sag length.

As in FIG. 3, the plurality of segment regions 141b to 144b share the center along the radial direction of the second reflective optical element 140b as a common center point and may be configured as a number, m, of segment regions 141b to 144b arranged along the radial direction. The radial direction may be the direction of a straight line connecting the outermost edges of the second reflective optical element 140b parallel to the horizontal direction in the diagram of FIG. 4. In FIG. 4, 'm' may be 4, and there may be 4 segment regions 141b to 144b. In this case, the diameter may be the length of a line segment connecting the outer edges of the 4th segment region 144b.

The second reflective optical element 140b may be manufactured to have a thin thickness for the reason described in FIG. 3. The thickness may be a length along the y-axis direction which is perpendicular to the diameter direction. The overall Sag of the second reflective optical element 140b is designed to have the Sag value of the first segment region 141b so that the thickness of the second reflective optical element 140b may be as thin as the Sag value of the first segment region 141b. The Sag value may be the thickness of the mirror-curvature portion, to be obtained by Equation 1.

Additionally, the Sag of the first segment region 141b which is closest to the center point may be set to less than ½ of the coherence distance of light. The Sag of the first segment region 141b is the overall Sag and may be an initial Sag value which is a design input variable. Concerning the coherence distance, the substantially same description as that of FIG. 3 may be referenced.

In the SIDH optical system, a spherical mirror may be used as a phase modulation mirror for a Fresnel zone plate-type point spread function to be recorded on a hologram for a point object. A simple method of reducing the thickness through conversion to a Fresnel lens shape presented as a spherical mirror may be setting, to −R+n*Sag, the vertical coordinates of the center of the spherical mirror having the same radius of curvature (R), corresponding to each of the segment regions 141b, 142b, 143b, 144b.

A condition for the segment regions 141b to 144b to have the same curvature is as follows. When the first segment region 141b is closest to the center point along the radial direction and the m-th segment region 144*b* is adjacent to the outermost edge of the second reflective optical element 140*b*, the n+1-th segment region and the n-th segment region may be configured to have respective Sag values that differ by a constant value. 'n' may be an integer greater than or equal to 1 and smaller than 'm'. In the present disclosure, for convenience of manufacturing, the centers of the spherical mirrors in each of the segment regions 141*b* to 144*b* may be spaced apart by the Sag of the first segment region 141*b*, which is the initial Sag value.

With the second reflective optical element 140*b* of the present disclosure, a high-resolution hologram can be implemented by securing sufficient curvature and at the same time, an optical path difference may be formed within a coherence distance thereby allowing the high-resolution hologram to be obtained in a large recording area.

Figure 5:
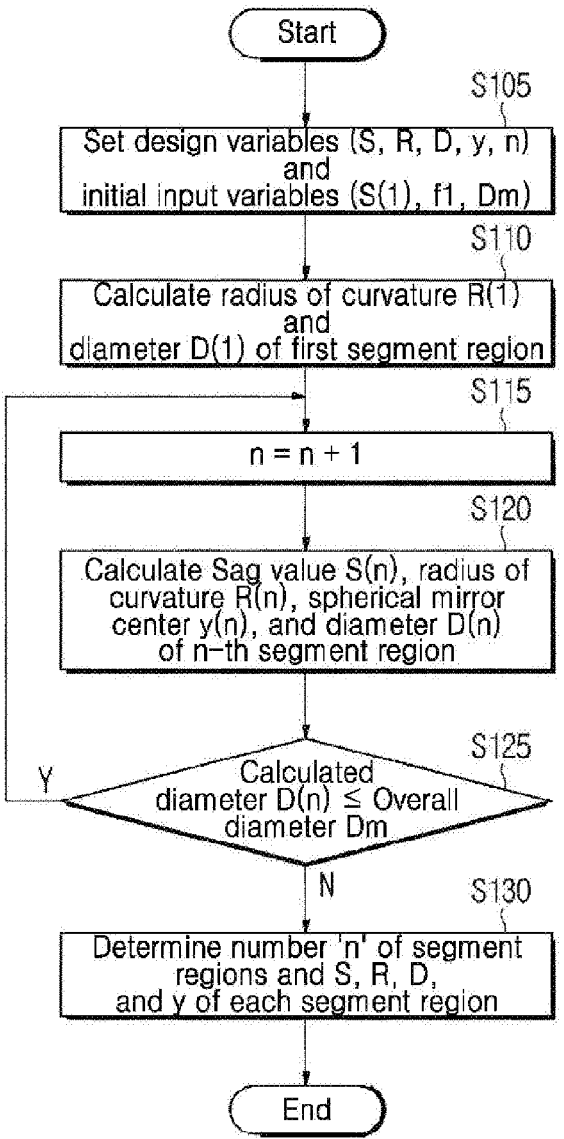
FIG. 5 is a flowchart of a design process for deriving manufacturing parameters of a second reflective optical element included in a hologram acquisition device according to at least one embodiment of the present disclosure.

FIG. 5 is a flowchart of a design process for deriving manufacturing parameters of the second reflective optical element included in a hologram acquisition apparatus according to at least one embodiment of the present disclosure. FIG. 5 shows a manufacturing process of the second reflective optical element 140*a* according to FIG. 3. Variables and symbols indicated in FIG. 5 are substantially the same as those in FIG. 3.

First, design variables and initial input variables of the second reflective optical element 140*a* may be set (S105).

The design variables are those of each of the segment regions and may be a Sag value S(n), a radius of curvature R(n), a diameter D(n), and a spherical mirror center coordinate y(n). Here, 'n' denotes the segment region's number, and the process of deriving manufacturing parameters may start from the first segment region 141*a* located at the center of the second reflective optical element 140*a*, that is, from n=1. Additionally, to determine the initial Sag value S(1), the coherence distance may be calculated using Equation 8.

To manufacture the second reflective optical element 140*a* having the same focal point, initial input variables may be set according to the specifications and conditions of the optical system to be used. Specifically, the constant value f1 as the focal length of the segment regions, their overall Sag value S(1), and the overall diameter Dm of the second reflective optical element 140*a* may be set. S(1) may be set to less than half the coherence distance.

Next, the radius of curvature R(1) and the diameter D(1) of the first segment region 141*a* may be calculated (S110). The radius of curvature R(1) is half the focal length f1, and the diameter D(1) may be determined through Equation 5.

Subsequently, the segment region's number may be incremented by 1 (S115), and design variables of the n-th segment region may be calculated (S120). Specifically, the Sag value S(n), the radius of curvature R(n), the spherical mirror center y(n), and the diameter D(n) may be calculated through Equations 7, 2, 3, and 5, respectively.

Thereafter, whether the diameter D(n) of the n-th segment region is less than or equal to the overall diameter Dm is checked (S125) and if yes (Yin Step S125), the steps of S115 and S120 may be repeated.

If the diameter D(n) of the n-th segment region exceeds the overall diameter Dm (N in Step S125), the design variables from the first segment region 141*a* to the n-th segment region may be determined as the manufacturing parameters of the second reflective optical element 140*a*, and the number 'n' of the segment regions may also be specified (S130). The design variables may be the Sag value, radius of curvature, the center of the spherical mirror, and the diameter D in each of the segment regions. The initial input variables may also be used as manufacturing parameters of the second reflective optical element 140*a*. According to the manufacturing process of FIG. 5, the number of segment regions tends to increase as the focal length decreases.

Exemplary methods of the present disclosure are presented as a series of operations for clarity, but the order of the steps is not limited thereto, and the illustrated steps may be performed simultaneously or in a different order if so desired. To implement the method according to the present disclosure, other steps may be included in addition to the illustrative steps, some steps may be excluded while others are included, or some steps may be excluded while additional steps are included.

Various embodiments of the present disclosure are intended to illustrate representative aspects of the present disclosure rather than to list all possible combinations. The matters described in the various embodiments may be applied independently or as a combination of two or more of such matters.

Additionally, various embodiments of the present disclosure may be implemented by hardware, firmware, software, or a combination thereof. When implemented by hardware, the embodiment may be implemented by at least one of application specific integrated circuits (ASICs), digital signal processors (DSPs), digital signal processing devices (DSPDs), programmable logic devices (PLDs), field programmable gate arrays (FPGAs), general-purpose processors, controllers, microcontrollers, microprocessors, and the like.

The scope of the present disclosure includes software or machine-executable instructions (e.g., operating systems, applications, firmware, programs, and the like) which cause operations according to the methods of various embodiments to be executed on a device or a computer and a non-transitory computer-readable medium in which such software or instructions and the like are stored and executable on a device or a computer.

The present disclosure can provide a hologram acquisition apparatus and system that obtains a high-resolution hologram in a large recording area.

Effects obtainable with the present disclosure are not limited to the above-mentioned effect, and other unmentioned effects could be clearly understood by those skilled in the art from the above description.

What is claimed is:

1. A hologram acquisition apparatus, comprising:
    a beam splitter configured to split light emitted from an object into a first beam and a second beam;
    a first reflective optical element configured to receive and emit the first beam to the beam splitter; and
    a second reflective optical element configured to receive and emit the second beam to the beam splitter and formed as an annular spherical array having discontinuous surfaces,
    wherein the second reflective optical element has a plurality of segment regions that are concentric and divided to have the discontinuous surfaces, and the plurality of segment regions are formed to have a same focal point.

2. The hologram acquisition apparatus of claim 1, wherein the plurality of segment regions are formed to have different curvatures.

3. The hologram acquisition apparatus of claim 1, wherein the plurality of segment regions comprise:
    a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm', wherein based on that the first segment region is closest to the center point and the m-th segment region is adjacent to an outermost edge of the second reflective optical element, a difference in a radius of curvature between the n+1-th segment region and the n-th segment region is set to twice a difference in sagittal height (Sag) between the n+1-th segment region and the n-th segment region.

4. The hologram acquisition apparatus of claim 1, wherein the plurality of segment regions comprise:

a number, m, of segment regions that share, as a common center point, a center along a radial direction of the second reflective optical element and include a first segment region that is closest to the center point and has a sagittal height (Sag) which is equal to or less than half of a coherence distance of the light.

5. The hologram acquisition apparatus of claim 1, wherein the second reflective optical element has a thickness that is equal to a sagittal height (Sag) of a first segment region.

6. The hologram acquisition apparatus of claim 1, wherein the plurality of segment regions are arranged to have a spherical shape that is optically continuous.

7. The hologram acquisition apparatus of claim 6, wherein the plurality of segment regions comprise:

a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm', wherein based on that the first segment region is closest to the center point and the m-th segment region is adjacent to an outermost edge of the second reflective optical element, a first diameter based on a radius of curvature of the n+1-th segment region and a difference in sagittal height (Sag) between the n+1th segment region and the first segment region and a second diameter based on a radius of curvature of the n-th segment region and a Sag of the n-th segment region are set to be the same.

8. A hologram acquisition apparatus, comprising:

a beam splitter configured to split light emitted from an object into a first beam and a second beam;

a first reflective optical element configured to receive and emit the first beam to the beam splitter; and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces, and the plurality of segment regions are formed to have a same curvature.

9. The hologram acquisition apparatus of claim 8, wherein the plurality of segment regions comprise:

a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm', wherein based on that the first segment region is closest to the center point and the m-th segment region is adjacent to an outermost edge of the second reflective optical element, the n+1-th segment region and the n-th segment region have respective sagittal heights (Sag values) that differ by a constant value.

10. The hologram acquisition apparatus of claim 8, wherein the plurality of segment regions are arranged to have a spherical shape that is optically discontinuous.

11. The hologram acquisition apparatus of claim 8, wherein the plurality of segment regions comprise:

a number, m, of segment regions that share, as a common center point, a center along a radial direction of the second reflective optical element and wherein a sagittal height (Sag) of a first segment region that is closest to the center point is equal to or less than half of a coherence distance of the light.

12. The hologram acquisition apparatus of claim 8, wherein the second reflective optical element has a thickness that is equal to a sagittal height (Sag) of a first segment region.

13. A hologram acquisition system, comprising:

a hologram acquisition apparatus; and an image-generating apparatus configured to generate a holographic image by receiving an interference fringe generated from the hologram acquisition apparatus, wherein the hologram acquisition apparatus comprises:

a beam splitter configured to split light emitted from an object into a first beam and a second beam;

a first reflective optical element configured to receive and emit the first beam to the beam splitter; and a second reflective optical element configured to receive and emit the second beam to the beam splitter and formed as an annular spherical array having discontinuous surfaces, wherein the second reflective optical element has a plurality of segment regions that are concentric and divided to have the discontinuous surfaces, and the plurality of segment regions are formed to have a same focal point.

14. The hologram acquisition system of claim 13, wherein the plurality of segment regions is formed to have different curvatures.

15. The hologram acquisition system of claim 13, wherein the plurality of segment regions comprise:

a number, m, of segment regions that share, as a common center point, a center along a radial direction of the second reflective optical element and include a first segment region, an n-th segment region, and an n+1-th segment region, where 'n' is an integer greater than or equal to 1 and less than 'm', wherein based on that the first segment region is closest to the center point and the n-th segment region is adjacent to an outermost edge of the second reflective optical element, a difference in a radius of curvature between the n+1-th segment region and the n-th segment region is set to twice a difference in sagittal height (Sag) between the n+1-th segment region and the n-th segment region.

16. The hologram acquisition system of claim 13, wherein the plurality of segment regions comprise:

a number, m, of segment regions that share, as a common center point, a center along a radial direction of the second reflective optical element and wherein a sagittal height (Sag) of a first segment region that is closest to the center point is equal to or less than half of a coherence distance of the light.

17. The hologram acquisition system of claim 13, wherein the second reflective optical element has a thickness that is equal to a sagittal height (Sag) of a first segment region.

18. The hologram acquisition system of claim 13, wherein the plurality of segment regions are arranged to have a spherical shape that is optically continuous.

19. The hologram acquisition system of claim 18, wherein the plurality of segment regions comprise:

a number, m, of segment regions that share, as a common center point, a center along a radial direction of the second reflective optical element and include a first segment region, an n-th segment region, an n+1-th segment region, and an m-th segment region, where 'n' is an integer greater than or equal to 1 and less than 'm', wherein based on that the first segment region is closest to the center point and the m-th segment region is adjacent to an outermost edge of the second reflective optical element, a first diameter based on a radius of curvature of the n+1-th segment region and a difference in sagittal height (Sag) between the n+1th segment region and the first segment region and a second diameter based on a radius of curvature of the n-th segment region and a Sag of the n-th segment region are set to be the same.

* * * * *